(12) United States Patent
Chung et al.

(10) Patent No.: US 9,114,724 B2
(45) Date of Patent: Aug. 25, 2015

(54) CONTROL METHOD OF HYBRID VEHICLE

(75) Inventors: Tae Young Chung, Gyeonggi-do (KR);
Byunghoon Yang, Gyeonggi-do (KR);
Jooyoung Park, Gyeonggi-do (KR);
Hyung Bin Ihm, Seoul (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 276 days.

(21) Appl. No.: 13/536,261

(22) Filed: Jun. 28, 2012

(65) Prior Publication Data

US 2013/0134915 A1 May 30, 2013

(30) Foreign Application Priority Data

Nov. 29, 2011 (KR) ........................ 10-2011-0126332

(51) Int. Cl.
| | | |
|---|---|---|
| *H02P 6/16* | (2006.01) | |
| *B60L 15/20* | (2006.01) | |
| *H02P 29/02* | (2006.01) | |
| *H02P 21/00* | (2006.01) | |
| *G05B 1/06* | (2006.01) | |
| *G05B 11/42* | (2006.01) | |

(52) U.S. Cl.
CPC ............ *B60L 15/20* (2013.01); *H02P 21/0096* (2013.01); *H02P 29/02* (2013.01); *Y02T 10/643* (2013.01); *Y02T 10/7275* (2013.01)

(58) Field of Classification Search
USPC .......... 318/400.02, 400.14, 400.15, 722, 727, 318/807, 685, 432
See application file for complete search history.

(56) References Cited

U.S. PATENT DOCUMENTS

| | | | | |
|---|---|---|---|---|
| 6,321,144 | B1 * | 11/2001 | Crombez | 701/22 |
| 8,924,070 | B2 * | 12/2014 | Gibson et al. | 701/29.1 |
| 8,956,266 | B2 * | 2/2015 | Oue et al. | 477/93 |
| 2008/0272731 | A1 * | 11/2008 | Schulz et al. | 318/807 |
| 2011/0029179 | A1 * | 2/2011 | Miyazaki et al. | 701/22 |
| 2011/0140643 | A1 * | 6/2011 | Wu | 318/400.15 |
| 2013/0054070 | A1 * | 2/2013 | Nakagawa | 701/22 |

FOREIGN PATENT DOCUMENTS

| | | | |
|---|---|---|---|
| JP | 2008109719 A1 | * | 5/2008 |
| JP | 2011158389 A | | 8/2011 |
| KR | 10-0440166 | | 7/2004 |
| KR | 100999302 B1 | * | 3/2010 |
| KR | 10-0999302 | | 12/2010 |
| KR | 100999302 B1 | * | 12/2010 |
| KR | 10-1012741 | | 2/2011 |

* cited by examiner

*Primary Examiner* — Paul Ip
*Assistant Examiner* — Said Bouziane
(74) *Attorney, Agent, or Firm* — Mintz Levin Cohn Ferris Glovsky and Popeo, P.C.; Peter F. Corless

(57) ABSTRACT

A control method of a vehicle having a motor according to an exemplary embodiment of the present invention can include confirming that a speed of the motor is not 0 and an output torque thereof is 0 in a condition that the vehicle is being operated, confirming that a voltage of the motor converges to a regular value, and accumulating control data for the motor and processing the control data to calculate an offset value of a resolver. Accordingly, the control method of a vehicle effectively determines whether the offset of the resolver is to be compensated without affecting the drivability of the vehicle.

4 Claims, 9 Drawing Sheets

FIG. 6

| Motor speed | ≠ 0 | = 0 | = 0 | ≠ 0 (high speed/low magnetic flux control) | ≠ 0 |
|---|---|---|---|---|---|
| Torque | ≠ 0 | ≠ 0 | = 0 | = 0 | = 0 |
| Axis D, Q current of motor | ≠ 0 | ≠ 0 | = 0 | ≠ 0 | = 0 |
| Resolver offset determination mode | No entry | No entry | No entry | No entry | Entry |

FIG. 7

| Motor speed | ≠ 0 | = 0 | = 0 | ≠ 0 (high speed/low magnetic flux control) |
|---|---|---|---|---|
| Torque | ≠ 0 | ≠ 0 | = 0 | = 0 |
| Axis D, Q current of motor | ≠ 0 | ≠ 0 | = 0 | ≠ 0 |
| SOFT – HEV | Driving(EV – HEV) /Regeneration | Driving(EV – HEV) /Regeneration | Stop | Driving(EV – HEV) /Regeneration |
| HARD – HEV | Driving(EV – HEV) /Regeneration | Driving(EV – HEV) /Regeneration | Stop | Driving(EV – HEV) /Regeneration |
| | | | Resolver offset determination mode | Resolver offset determination mode |

CONTROL METHOD OF HYBRID VEHICLE

CROSS-REFERENCE TO RELATED APPLICATION

This application claims priority to and the benefit of Korean Patent Application No. 10-2011-0126332 filed in the Korean Intellectual Property Office on Nov. 29, 2011, the entire contents of which are incorporated herein by reference.

FIELD OF THE INVENTION

The present invention relates to a control method of a hybrid vehicle that automatically measures an error (offset) of a resolver and compensates the offset value of the error so as to accurately control torque and speed of a motor.

BACKGROUND OF THE INVENTION

Generally, an MCU (motor control unit) is used to control an induction motor or a synchronous motor that is used in an electric vehicle and a hybrid vehicle. For this, a coordinate system is established according to a position of flux. Accordingly, a resolver is used to read an absolute position of a motor rotator.

A resolver is a kind of transformer to transmit an excitation voltage to a first side winding (input side), and if an axis is rotated, a magnetic coupling coefficient is transformed and a voltage that varies the amplitude of a carrier is generated in a second side winding (output).

The winding is arranged such that the voltage varies along sine and cosine curves based on the rotation angle. Accordingly, the rotation angle of the resolver can be detected by reading the carrier amplitude of the sine output and the cosine output.

A resolver that is operated according to the above principle senses speed and phase data of the motor and transfers the position data of the motor rotator to the MCU, and these are used for generating a torque order and speed order.

However, an offset or error can be generated while mounting the resolver, so an accurate position of the rotator of the motor cannot be detected because of the error or the offset, and this causes the motor to be abnormally operated.

Accordingly, as a method for compensating the sensing error, a measuring instrument such as an oscilloscope is used to analyze a waveform of the resolver and line-to-line counter-electromotive force of the motor and then an offset value for the sensing error is compensated.

This method is performed by a manual operation of an operator, so the time required is increased, the amount of work is increased, and all vehicles have to be compensated. Also, the compensation value can vary according to the skill level of the operator.

The above information disclosed in this Background section is only for enhancement of understanding of the background of the invention and therefore it can contain information that does not form the prior art that is already known in this country to a person of ordinary skill in the art.

SUMMARY OF THE INVENTION

The present invention has been made in an effort to provide a control method of a vehicle having a motor having advantages of monitoring an offset of a resolver while driving without affecting drivability and determining whether the offset is to be compensated.

A control method of a vehicle having a motor according to an exemplary embodiment of the present invention can include confirming that a speed of the motor is not 0 and an output torque thereof is 0 in a condition that the vehicle is being operated, confirming that a voltage of the motor converges to a regular value, and accumulating control data the motor and processing the control data to calculate an offset value of a resolver.

The offset mode can be performed in a condition that the speed of the vehicle is not 0.

A point that an output torque of the motor is 0 can be extended to can be within a predetermined speed range of the motor. The predetermined speed range can be between about 1,000 RPM and about 2,000 RPM.

While the current of the motor converges to the predetermined value, an axis D voltage of the motor can converge to a predetermined range. The predetermined range can be between about −1.2 V and about +1.2 V.

While the current of the motor converges to the predetermined value, an axis Q voltage of the motor can converge to a predetermined range. The predetermined range can be between about −1.2 V and about +1.2 V.

While the current of the motor converges to the predetermined value, an axis D voltage and an axis Q voltage of the motor can converge to a predetermined range. The predetermined range can be between about −1.2 V and about +1.2 V.

When it is confirmed that the torque of the motor is 0, the motor can be controlled in a 0-current condition.

The offset value can be calculated in accordance with equations $v_d = \omega \psi_F \sin(\alpha - \alpha^*)$ and $v_q = \omega \psi_F \cos(\alpha - \alpha^*)$, wherein $v_d$ denotes an axis D voltage, $v_q$ denotes an axis Q voltage, $\omega$ denotes a rotator angle speed, $\psi_F$ denotes a size of flux, $\alpha$ denotes a final offset value, and $\alpha^*$ denotes an offset candidate value.

The regular value can be between about 0.3 V and about 1 V.

A non-transitory computer-readable medium containing program instructions executed by a processor or controller to implement a control method of a vehicle having a motor according to an exemplary embodiment of the invention can include: program instructions that confirm that a speed of the motor is not 0 and an output torque thereof is 0 in a condition that the vehicle is being operated; program instructions that confirm that a voltage of the motor converges to a regular value; and program instructions that accumulate control data for the motor and processing the data to calculate an offset value of a resolver.

The control method of a vehicle having a motor according to an exemplary embodiment of the present invention effectively determines whether the offset of the resolver is to be compensated without affecting the drivability of the vehicle.

DEFINITIONS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

BRIEF DESCRIPTION OF THE DRAWINGS

While the drawings are described in connection with what is presently considered to be practical exemplary embodiments, it is to be understood that the invention is not limited to the disclosed drawings.

FIG. 6 is a table showing an offset determination mode entry condition of a resolver disposed in a hybrid vehicle according to an exemplary embodiment of the present invention.

FIG. 7 is a table showing an offset determination mode entry condition of a resolver disposed in a hybrid vehicle and a driving mode according to an exemplary embodiment of the present invention.

Figure 1:
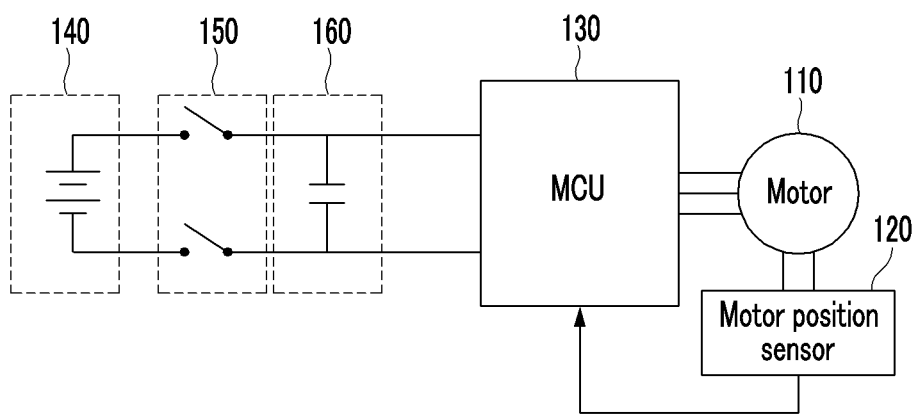
FIG. 1 is a schematic diagram of a vehicle having a motor according to an exemplary embodiment of the present invention.

The following legend of reference numerals used in the figures is provided for the reader's convenience:
110: motor
120: resolver
130: motor control unit
140: high voltage battery
150: main relay
160: capacitor
210: current order generator
220: current controller
230: axis converter
240: PWM (pulse-width modulation) generator
250: PWM inverter
260: resolver offset determiner
310: speed/torque determiner
320: 0-current control determiner
330: voltage sensing and resolver offset calculating portion

DETAILED DESCRIPTION OF THE EMBODIMENTS

Hereinafter, the present invention will be described more fully with reference to the accompanying drawings, in which exemplary embodiments of the invention are shown. As those skilled in the art will realize, the described embodiments can be modified in various different ways, all without departing from the spirit or scope of the present invention.

Portions having no relation with the description will be omitted in order to explicitly explain the present invention, and the same reference numerals will be used for the same or similar elements throughout the specification.

In the drawings, size and thickness of each element are approximately shown for better understanding and ease of description. Therefore, the present invention is not limited to the drawings, and the thicknesses of layers, films, panels, regions, etc., can be exaggerated for clarity.

FIG. 1 is a schematic diagram of a vehicle having a motor according to an exemplary embodiment of the present invention.

Referring to FIG. 1, a vehicle having a motor includes the motor 110, a resolver 120, a motor control unit 130, a high voltage battery 140, a main relay 150, a capacitor 160, and a BMS (battery management system), wherein the system can be applied to a hybrid vehicle, an electric vehicle, and a fuel cell vehicle. The motor 110 can output torque developed by electricity and can generate electricity.

The motor 110 is controlled by the motor control unit 130, and the motor control unit 130 includes an inverter that transforms a DC current to a variable frequency and an AC current of a variable voltage, and a control portion controlling current and voltage.

The resolver 120 is a motor position sensor that provides rotation position information of the motor 110 to the motor control unit 130. The motor control unit 130, in turn, controls the current and voltage that is supplied to the motor 110.

Figure 2:
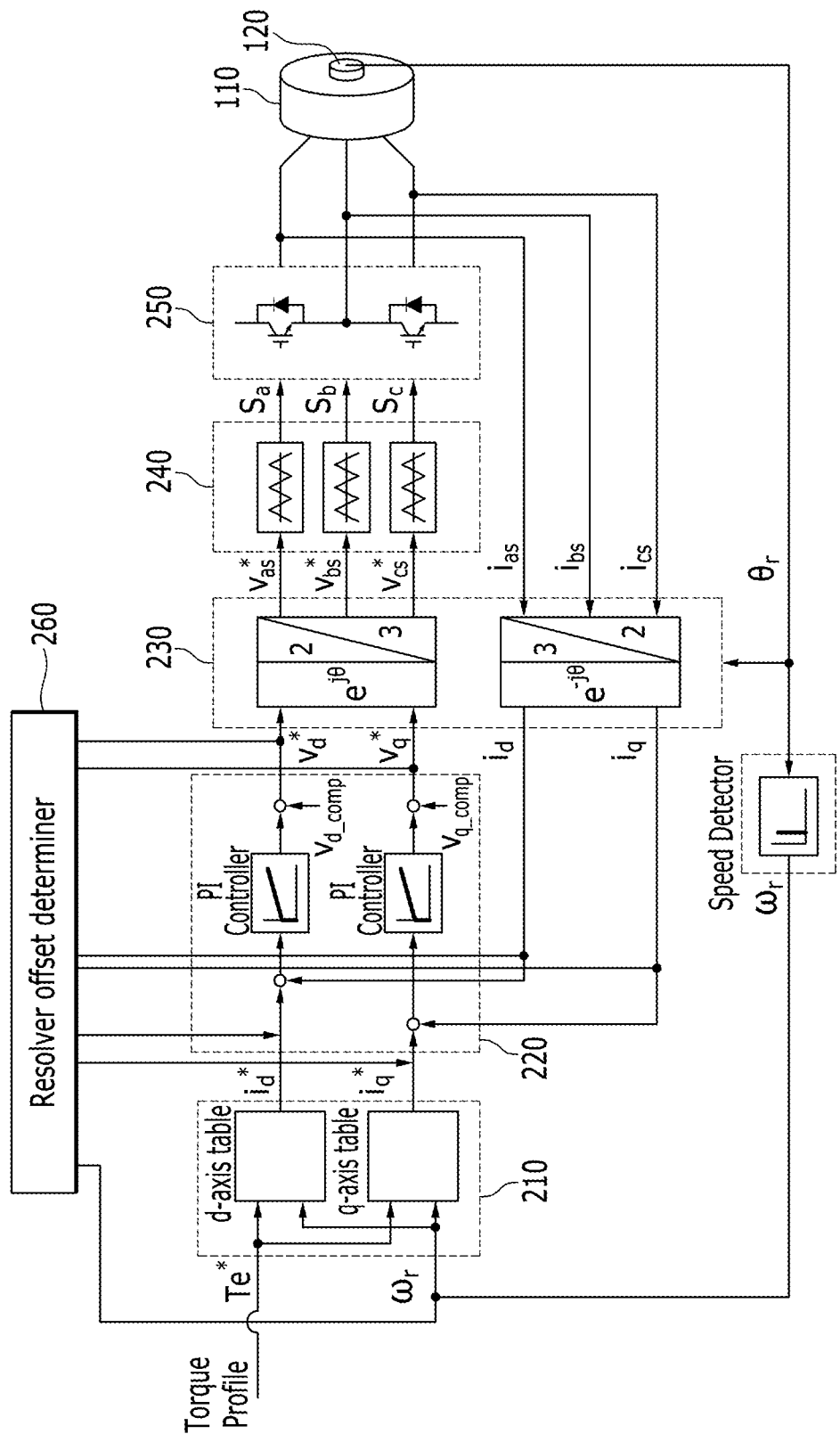
FIG. 2 is a circuit diagram for an MCU control portion controlling a motor according to an exemplary embodiment of the present invention.

FIG. 2 is a circuit diagram for an MCU control portion controlling a motor according to an exemplary embodiment of the present invention.

Referring to FIG. 2, a control portion of an MCU 130 includes a current order generator 210, a current controller 220, an axis converter 230, a PWM generator 240, a PWM inverter 250, and a resolver offset determiner 260.

If a torque order or a speed order is input from a higher rank control portion, the motor control unit 130 generates axis D and axis Q current orders in the current order generator 210, and the current controller 220 performs current control such that the inverter current follows the current order.

The axis converter 230 transforms current from axis D and axis Q to three phases, the PWM generator 240 transmits a PWM switching signal to an inverter based on the current order, and the PWM inverter 250 controls the motor through switching based on the PWM switching signal.

The resolver offset determiner 260 uses the torque order and current order that are transferred from the higher rank control portion, current that is fed back from the motor, axis D and Q voltages that are monitored, and the like to determine the offset of the resolver 120.

The present invention enters into a resolver offset determination mode in a 0-torque period during which 0-current controlling is possible in a driving condition, and performs 0-current controlling in a condition in which the drivability of the vehicle is not affected to determine the offset of the resolver.

Figure 3:
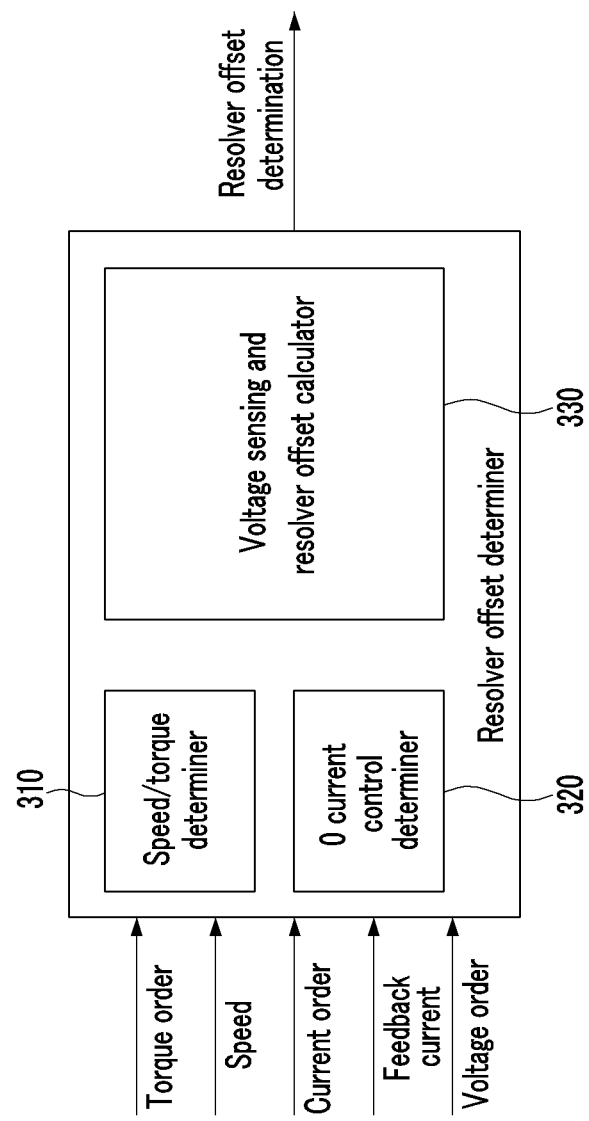
FIG. 3 is a schematic diagram of a resolver offset determiner according to an exemplary embodiment of the present invention.

FIG. 3 is a schematic diagram of a resolver offset determiner according to an exemplary embodiment of the present invention.

Referring to FIG. 3, the resolver offset determiner 260 includes a speed/torque determiner 310, a 0-current control determiner 320, and a voltage sensing and resolver offset calculating portion 330.

The speed/torque determiner 310 monitors the speed and torque order of the motor and the 0-current control determiner 320 monitors a torque that is demanded by the motor.

Further, the voltage sensing and resolver offset calculating portion 330 senses the voltage according to the speed and the 0-current condition of the motor to determine the offset of the resolver. In one embodiment, the offset of the resolver is determined in accordance with Equation (1) below.

$$v_d = \left(R + L_d \frac{d}{dt}\right) i_d - \omega L_q i_q - \omega \psi_F \sin(\alpha - \alpha^*) \quad (1)$$

$$v_q = \left(R + L_q \frac{d}{dt}\right) i_q - \omega L_d i_d + \omega \psi_F \sin(\alpha - \alpha^*)$$

In Equation (1), R denotes a resistance that is applied to the motor 110, $L_d$ denotes an axis D inductance constant, $L_q$ denotes an axis Q inductance constant, $\psi_F$ denotes a size of flux, $\alpha$ denotes a final offset value, and $\alpha^*$ denotes an offset candidate value.

Further, in Equation (1), $i_d$ denotes an axis D current, $i_q$ denotes an axis Q current, $v_d$ denotes an axis D voltage, $v_q$ denotes an axis Q voltage, and $\omega$ denotes a rotator angle speed.

In the first equation, if the axis D current ($i_d$) and the axis Q current ($i_q$) converge to 0 by 0-current control, Equation (1) can be transformed to Equation (2) below.

$$v_d = \omega \psi_F \sin(\alpha - \alpha^*)$$

$$v_q = \omega \psi_F \cos(\alpha - \alpha^*) \quad (2)$$

Figure 4:
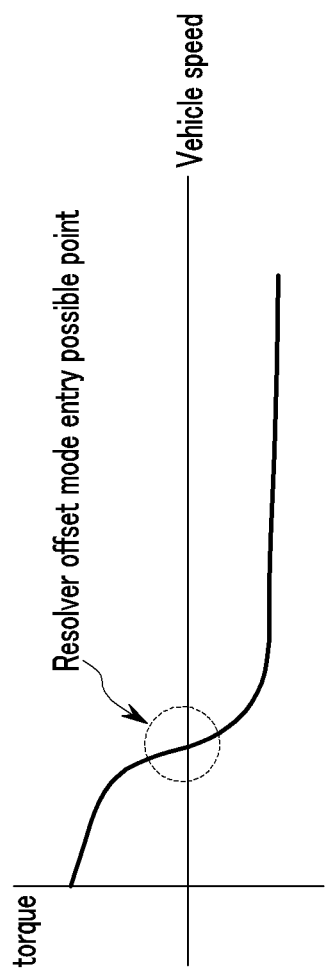
FIG. 4 is a graph showing a torque profile according to speed of a motor disposed in a hybrid vehicle according to an exemplary embodiment of the present invention.

FIG. 4 is a graph showing a torque profile according to a speed of a motor disposed in a hybrid vehicle according to an exemplary embodiment of the present invention.

Referring to FIG. 4, the horizontal axis denotes a vehicle speed, and the vertical axis denotes an output torque of a motor.

The motor 110 outputs a torque at a slower speed than a predetermined value, and the motor 110 generates electricity to perform regeneration at a faster speed than a predetermined value.

Figure 5:
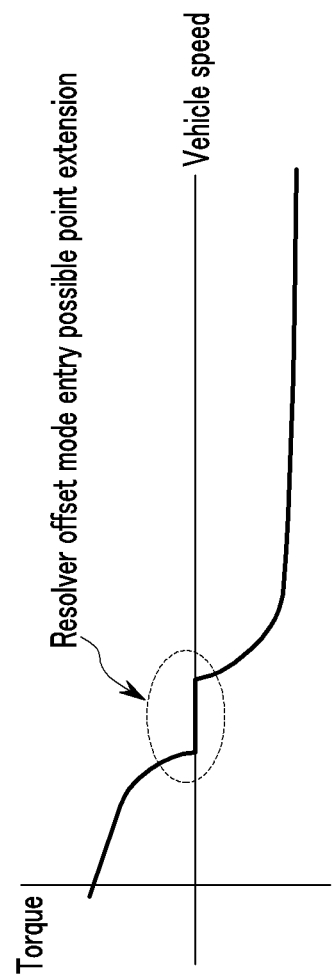
FIG. 5 is a graph showing a state that a torque profile is changed according to speed of a motor disposed in a hybrid vehicle according to an exemplary embodiment of the present invention.

FIG. 5 is a graph showing a state that a torque profile is changed according to a speed of a motor disposed in a hybrid vehicle according to an exemplary embodiment of the present invention.

Referring to FIG. 5, the horizontal axis denotes a vehicle speed, and the vertical axis denotes an output torque of a motor. Compared to FIG. 4, the torque profile is transformed and the 0-torque section is extended in a condition that a vehicle speed ranges within a predetermined range such that the system can easily enter into an offset determination mode.

FIG. 6 is a table showing an offset determination mode entry condition of a resolver disposed in a hybrid vehicle according to an exemplary embodiment of the present invention.

Referring to FIG. 6, if a motor speed is not 0, an output torque thereof is 0, and axis D and Q currents are 0, the vehicle enters into a resolver offset determination mode.

FIG. 7 is a table showing an offset determination mode entry condition of a resolver disposed in a hybrid vehicle and a driving mode according to an exemplary embodiment of the present invention.

Referring to FIG. 7, in a condition that a motor speed is not 0, an output torque thereof is 0, and axis C and Q currents are 0, the vehicle enters into a resolver offset determination mode.

Figure 8:
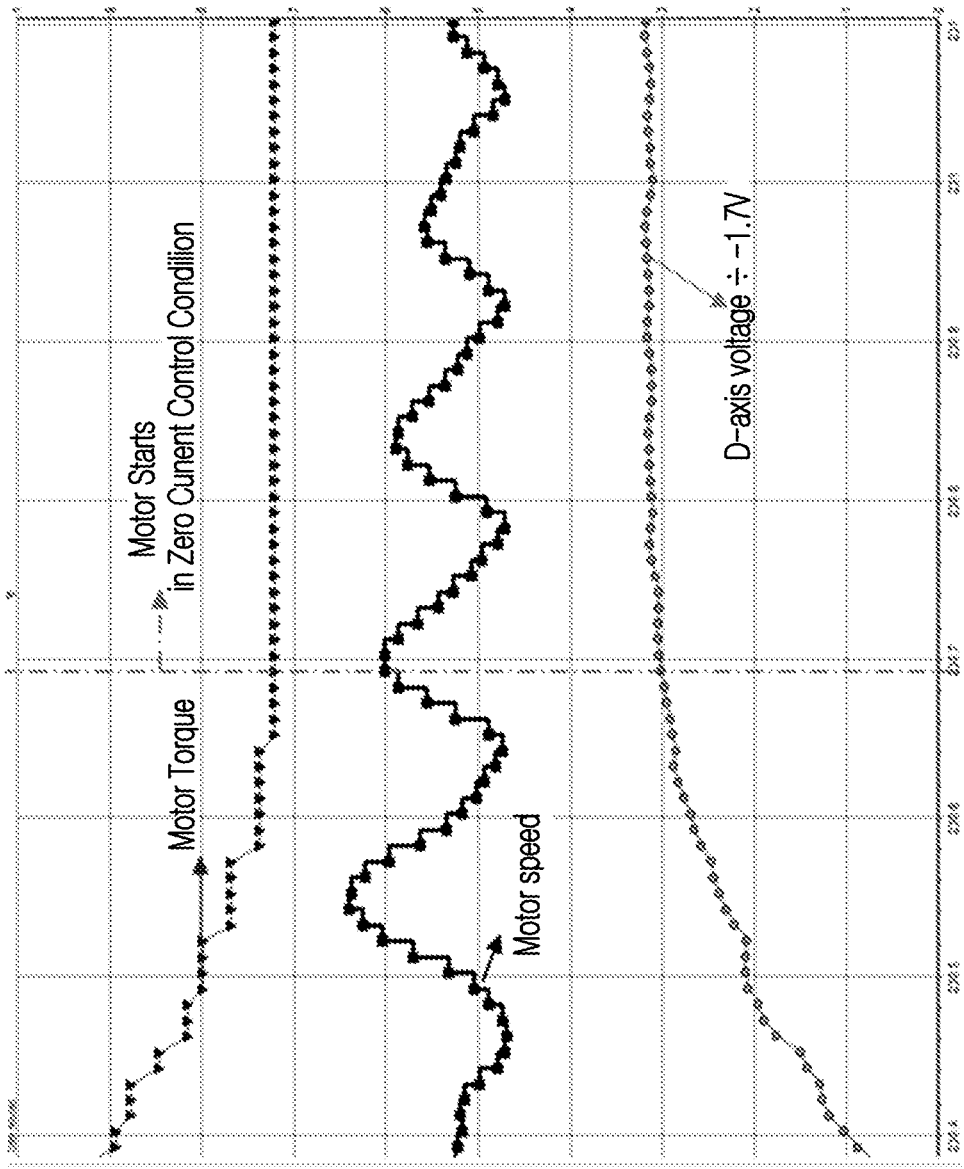
FIG. 8 is a graph showing a $v_d$ value in a condition that an offset error of a resolver is formed in a hybrid vehicle according to an exemplary embodiment of the present invention.

FIG. 8 is a graph showing $v_d$ values in a condition that an offset error of a resolver is formed in a hybrid vehicle according to an exemplary embodiment of the present invention.

Referring to FIG. 8, if the vehicle enters into a resolver offset determination mode, the current of the motor 110 converges to 0 by the 0-current control, the speed of the motor 110 varies in a predetermined range, and the axis D voltage (Vd) slowly converges to a predetermined value.

As shown, a predetermined converging time is necessary to determine the offset of the resolver of the motor 110. Accordingly, when the vehicle enters into a resolver offset determination mode during a driving condition, data is gathered, filtered, or averaged to perform calculation of the resolver after a predetermined time.

Figure 9:
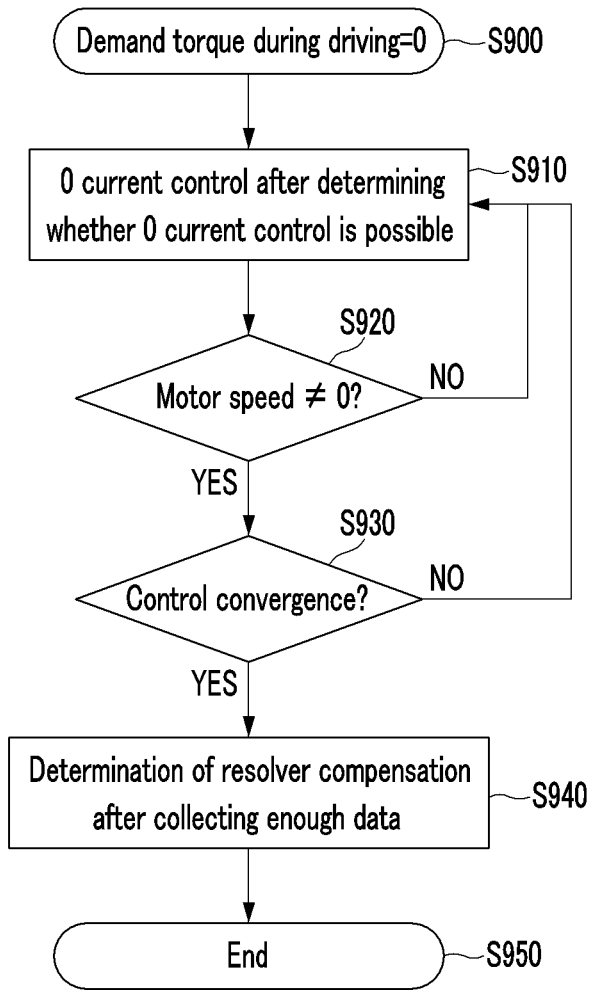
FIG. 9 is a flowchart showing a method for entering a mode for determining an offset of a resolver in a hybrid vehicle according to an exemplary embodiment of the present invention.

FIG. 9 is a flowchart showing a method for entering a mode for determining an offset of a resolver in a hybrid vehicle according to an exemplary embodiment of the present invention.

Referring to FIG. 9, it is determined whether a demanded torque of the motor 110 is 0 while driving in S900, and it is determined whether 0-current control is possible in S910.

It is determined whether a speed of the motor 110 is 0 in S920, and it is determined whether data for the control converge to a predetermined value in S930. Data is gathered for a predetermined section in S940, the data is processed to determine whether an offset value of the resolver is to be compensated, and the control is ended in S950.

The data includes all control data for the motor 110, which includes a resistance that is applied to the motor 110, an axis D inductance constant, an axis Q inductance constant, a size of flux, a final offset value, an offset candidate value, an axis D current, an axis Q current, axis D voltage, axis Q voltage, and an angle speed of a rotator.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, although various aspects of the invention are in the context of a single unit or a plurality of units, it is understood that the invention can also be performed by a plurality of units or a single unit, respectively.

Furthermore, the control logic of the present invention can be embodied as non-transitory computer-readable media on a computer-readable medium containing executable program instructions executed by a processor, controller or the like. Examples of computer-readable media include, but are not limited to, ROM, RAM, compact disc (CD)-ROMs, magnetic tapes, floppy disks, flash drives, smart cards and optical data storage devices. The computer-readable recording medium can also be distributed in network coupled computer systems so that the computer-readable media is stored and executed in a distributed fashion, e.g., by a telematics server or a Controller Area Network (CAN).

What is claimed is:

1. A control method of a vehicle having a motor, comprising:
    confirming that a speed of the motor is not 0 and an output torque thereof is 0 in a condition that the vehicle is being operated;
    confirming that a voltage of the motor converges to a regular value; and
    accumulating control data for the motor and processing the control data by a resolver offset determiner to calculate an offset value of a resolver,
    wherein while a current of the motor converges to a predetermined value, an axis D voltage and an axis Q voltage of the motor converge to a predetermined range, and
    a point that the output torque of the motor is 0 is extended to within a predetermined speed range of the motor, such that the control data for the motor is accumulated in the predetermined speed range in order to calculate the offset value of the resolver.

2. The control method of claim 1, wherein an offset mode is performed in a condition that the speed of the vehicle is not 0.

3. The control method of claim 1, wherein the predetermined speed range is between 1,000 RPM and 2,000 RPM.

4. A non-transitory computer-readable medium containing program instructions executed by a processor or controller to implement a control method of a vehicle having a motor, the computer-readable medium comprising:
    program instructions executed by the controller that confirm that a speed of the motor is not 0 and an output torque thereof is 0 in a condition that the vehicle is being operated;
    program instructions executed by the controller that confirm that a voltage of the motor converges to a regular value; and
    program instructions that accumulate control data for the motor and processing the data by a resolver offset determiner to calculate an offset value of a resolver,
    wherein while a current of the motor converges to a predetermined value, an axis D voltage and an axis Q voltage of the motor converge to a predetermined range, and
    a point that the output torque of the motor is 0 is extended to within a predetermined speed range of the motor, such that the control data for the motor is accumulated in the predetermined speed range in order to calculate the offset value of the resolver.

* * * * *